Nov. 5, 1968  M. H. FRENCH ET AL  3,409,376
INTERFEROMETER ALIGNMENT
Filed Oct. 26, 1964  2 Sheets-Sheet 1
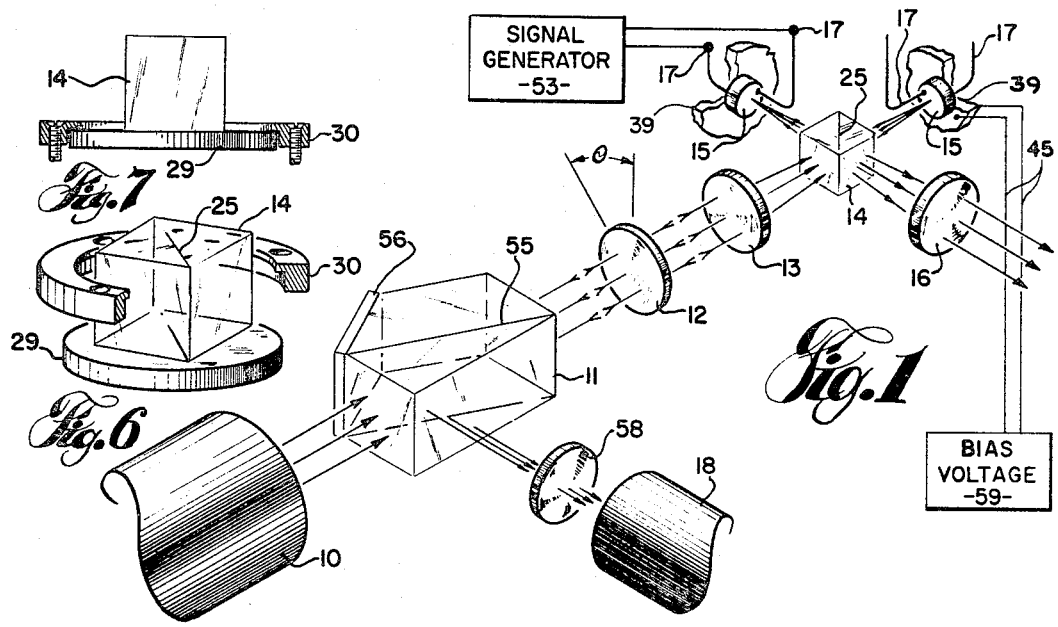
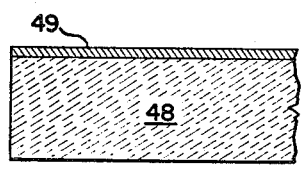
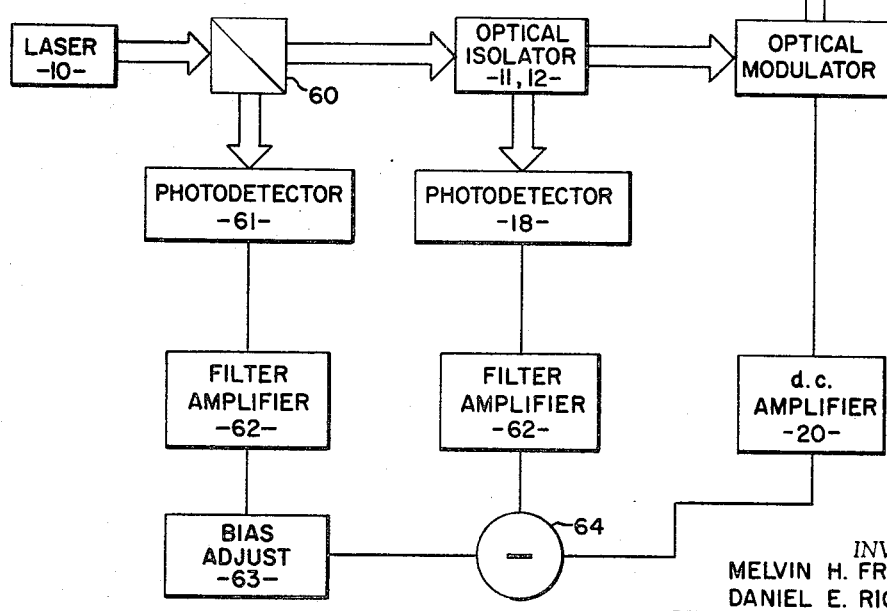
INVENTORS
MELVIN H. FRENCH
DANIEL E. RICHMOND
BY
Richard D. Seibel
ATTORNEY

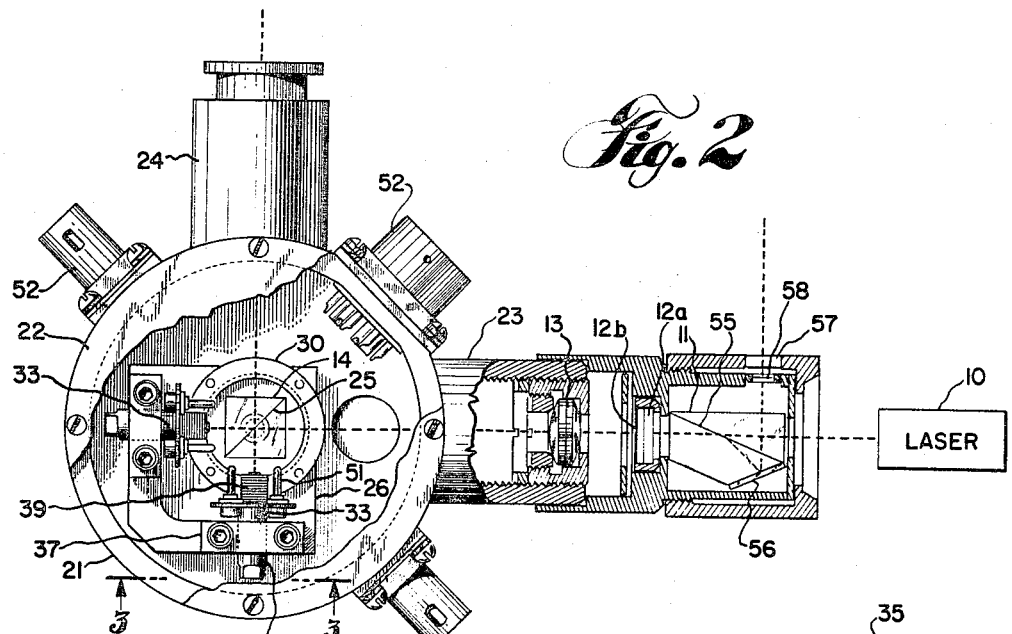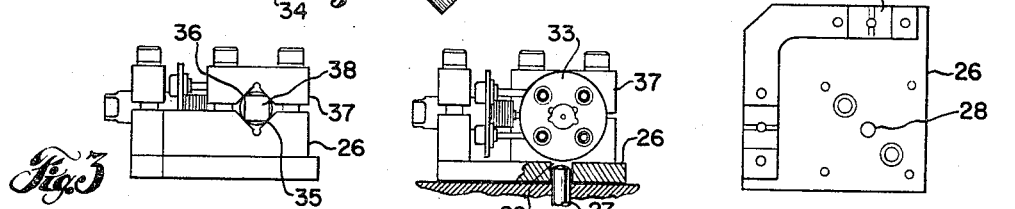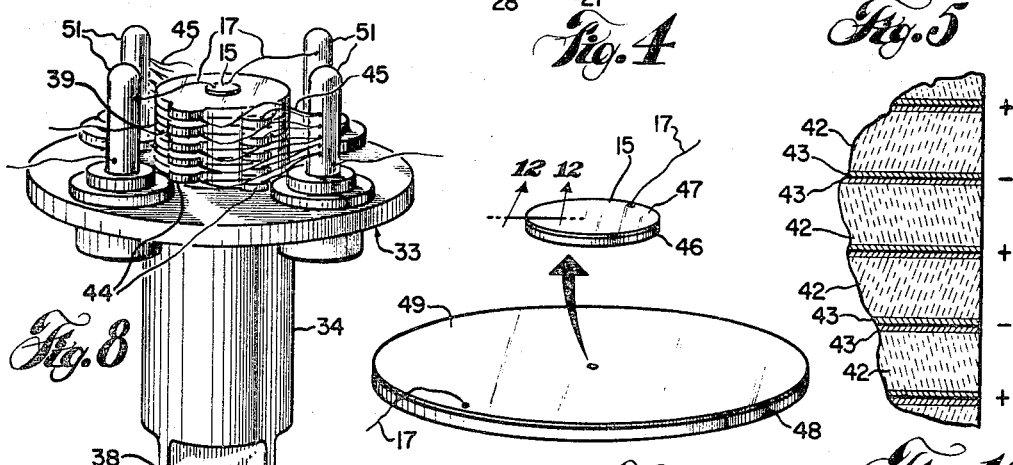

United States Patent Office

3,409,376
Patented Nov. 5, 1968

3,409,376
INTERFEROMETER ALIGNMENT
Melvin H. French, Redondo Beach, and Daniel E. Richmond, San Pedro, Calif., assignors to North American Rockwell Corporation, a corporation of Delaware
Filed Oct. 26, 1964, Ser. No. 406,434
14 Claims. (Cl. 356—110)

ABSTRACT OF THE DISCLOSURE

Means for optically aligning an interference type light modulator is described wherein the two reflective surfaces in the two legs of the interferometer are each rotatable about axes extending approximately normal to the respective surfaces so that reflected light beams therefrom are re-directed in a common plane. A beam splitter cube in the common plane between the two reflective surfaces is rotatable about an axis normal to the common plane so that the beam splitting plane therein bisects the angle between the reflective surfaces for precise recombination of the light beam reflected from the two reflective surfaces.

---

In the construction of light interferometers it is desirable to provide certain manufacturing and assembly tolerances. These tolerances may be sufficient when accumulated to cause a divergence of light beams exiting from the interferometer. If the light beams diverge, optimum interference therebetween cannot occur.

It is therefore a broad object of this invention to provide a means for eliminating divergence of light beams from an interferometer.

Previously available interferometers have required accurate fabrication to obtain optical alignment of the elements. The reflective mirrors of the interferometer are commonly mounted on a three point suspension having two or three adjustment screws for tipping the mirror. The alignment of the interferometer is a delicate and tedious operation requiring patience and repeated adjustment of the individual adjustment screws. Even after adjustment, the interferometer is a delicate instrument easily misaligned in strenuous service. In the practice of this invention there is provided a rugged interferometer that is easily aligned in a few simple operations.

Thus in the practice of this invention according to a preferred embodiment there is provided an interference type light modulator having a beam splitter and a pair of reflective signal transducers. The signal transducers are mounted for rotational adjustment so that any angular deviation of a reflected light beam from an incident light beam can be rotated into a common plane. Additionally means are provided for rotating a beam splitting plane to bisect the angle between the normals to the signal transducers thereby causing exact recombination of light beams reflected from the signal transducers.

Thus it is a broad object of this invention to provide a means for separating and accurately recombining a light beam.

It is another object of this invention to provide an improved optical modulator.

It is a further object of this invention to provide adjustment of an interferometer.

Other objects and many of the attendant advantages of this invention will be readily appreciated as the same becomes better understood by reference to the following detailed description when considered in connection with the accompanying drawings wherein:

FIG. 1 illustrates in schematic form an optical system embodying the principles of this invention;

FIG. 2 illustrates a preferred embodiment of an optical modulator;

FIG. 3 is a side view of a portion of the modulator of FIG. 2 illustrating a platform assembly on which optical elements are mounted;

FIG. 4 is another side view of the platform assembly of FIG. 3;

FIG. 5 is a top view of the platform of FIG. 3;

FIG. 6 is a partially exploded perspective view of a beam splitter employed in the optical modulator of FIG. 2;

FIG. 7 is a partial sectional view of the beam splitter of FIG. 6;

FIG. 8 is a perspective view of a pedestal assembly employed in the modulator of FIG. 2;

FIG. 9 is an end view of transducer elements on the pedestal assembly of FIG. 8;

FIG. 10 is a partial view of transducer elements of FIG. 9;

FIG. 11 is an exploded view of a portion of the transducer elements of FIG. 9;

FIG. 12 is a partial sectional view of one of the transducer elements of FIG. 9; and FIG. 13 illustrates a feedback network employed in the practice of this invention.

Throughout the drawings like reference numerals refer to like parts.

The modulator described herein illustrates certain improvements in an interference modulator described and claimed in copending U.S. patent application Ser. No. 294,585, now U.S. Patent No. 3,302,027 entitled "Light Interference Method and Apparatus" by David L. Fried and Wendell S. Read and assigned to North American Aviation, Inc., the assignee of this application.

Certain aspects of an apparatus constructed according to the principles of this invention are described and claimed in copending application Ser. No. 406,424 entitled "Light Control Means" filed by Gus E. Mevers and David B. Pollack and assigned to North American Aviation, Inc., the assignee of this invention.

As illustrated in FIG. 1 which depicts schematically an optical system which incorporates the principles of this invention, there is provided a laser 10 which is preferably a continuous wave gas laser for providing a monochromatic continuous beam of coherent light which may be in the ultra-violet, visible or infra-red portions of the spectrum. A typical laser for use in this invention comprises a helium-neon gas laser which has a sharp monochromatic beam with a wave length of 6328.17 Angstroms in the red region of the visible spectrum. A suitable laser light source is a continuous wave gas laser such as the Model 110 manufactured by Perkin-Elmer Spectra-Physics, Inc. A laser useful in the practice of this invention is described in U.S. Patent 2,929,922 to A. L. Schawlow, et al., entitled "Masers and Maser Communications System."

The light beam from the laser passes through an optical isolator comprising a polarizer or analyzer 11 which is preferably a Foster-Seeley prism for plane polarizing the light beam. Plane polarized light from the plane polarizer 11 then passes through a quarter wave retardation plate 12 for converting the plane polarized beam to a circularly polarized beam. If the polarization axis of the retardation plate is to the right of the axis of the plane polarizer 11, the circularly polarized beam has one handedness of polarization and if to the left, the output beam has the other handedness of polarization. The usefulness of the prism and retardation plate as a circular polarizer stems from the fact that a righthanded beam cannot pass through a lefthanded circular analyzer no matter how the optical isolator may be rotated. Additionally a righthanded beam when reflected becomes a lefthanded beam and thus cannot pass through the polarizer combination that originally polarized the beam.

After passing through the plane polarizer 11 and the quarter wave retardation plate 12 the circularly polarized light beam passes through a focusing lens 13 which focuses the parallel light beam from the laser. The focused light beam then passes through a beam splitter 14 which divides the beam of light into two separate beams of equal intensity. These beams impinge on reflecting surfaces of transducers 15 positioned so as to be in the focal plane of the lens 13. Light reflected from the transducers 15 is recombined in the beam splitter 14 and a portion of the recombined light passes through the collimating lens 16 which recollimates the output beam for transmission to an optical receiver. This output light beam is in a common plane with the input light beam and normal thereto. Another portion of the recombined beam passes retrodirectively through the focusing lens 13 and is thereby recollimated and directed to the optical isolator.

The beam splitter 14 and the mirror-like transducers 15 form an interferometric optical modulator. In a preferred embodiment each of the reflecting transducers 15 comprise piezoelectric elements having a reflective front surface. The rear surface of the piezoelectric transducers is substantially fixed in position except as described hereinafter and the reflective front surface is free to move. Electrical leads 17 secured to the front and back surfaces respectively of the transducers are employed to impose a varying electric field across the piezoelectric material. The varying electric fields on the two transducers are suitably phased so that the front surface of one of the transducers moves toward the beam splitter as the front surface of the other transducer moves away from the beam splitter. This is accomplished either by reversing the polarity of the transducers or the polarity of the electrical connections. The resultant difference in relative path length on the legs of the interferometer causes a change between constructive and destructive interference or vice versa and varies the amplitude of the output light beam from the modulator. Both transducers are operated in suitable phase relation to reduce the displacement that would be required of a single transducer to obtain the same depth of modulation; hence the depth of modulation of the modulator is doubled for a given driving signal.

As previously mentioned a portion of the light recombined by the beam splitter 14 is recollimated by the focusing lens 13 and transmitted retrodirectively toward the laser 10. Since this returning light beam is a reflected beam the handedness of the circular polarization has been reversed and the combination of the retardation plate 12 and plane polarizer-analyzer 11 prevents passage of this reflected light beam back to the laser thereby minimizing fluctuations of the intensity of the laser output. The Foster-Seeley prism rejects the reflected light beam and directs it at 90° to the transmitted beam therethrough. The reflected beam passes through a retardation plate 58, thereby becoming circularly polarized. The optic axis of the retardation plate 58 is arranged at an angle to the plane of polarization of the rejected beam so that the handedness of polarization of the beam is opposite to the handedness of the output beam from the modulator.

In the illustrated embodiment the reflected output beam is directed to a photodetector 18 for producing electrical signals corresponding to the light intensity for monitoring modulator output and providing feedback control thereof. It will be recognized that in the operation of the interference light modulator light energy is not lost except for minor absorptions in the optical elements. When the optical modulator is adjusted for maximum destructive interference in the output light beam, it is also providing maximum constructive interference in the light beam retrodirected toward the light source. Thus when the instantaneous intensity of the modulator output beam from the collimating lens 16 increases there is a corresponding decrease in the intensity of the retrodirected light beam from the focusing lens 13 and vice versa. Thus the intensity of the reflected output light beam and hence electrical signal from the photodetector 18 corresponds to the light intensity of the output light beam of the modulator, but is of exactly opposite phase. This signal is employed as feedback to insure optimum operation of the modulator, and is employed to transmit information as described more fully hereinafter.

In FIG. 2 there is illustrated a preferred embodiment of an optical modulator incorporating the principles of this invention. As illustrated in this embodiment there is provided a shallow cylindrical housing 21 being closed at one end and open at the other. A cover 22 is provided for the housing so as to provide a light tight enclosure. An input light tube 23 is provided on one side of the housing 21. Light from a source of coherent radiation such as a laser enters the input tube through a Foster-Seeley prism 11. The Foster-Seeley prism is a calcite prism having two pieces of calcite with the optic axes aligned so that a high rejection of light that is plane polarized perpendicular to the transmission axis of the prism is obtained. Basically it comprises a Glan-Thompson prism having one edge modified with a totally reflecting face 56 so that the extraordinary ray from the plane 55 is reflected back through the prism and emerges normal to the ordinary ray. A rejection greater than 10,000:1 is obtained from such a prism alone if the beam spread through the prism is limited to one arc-minute. A Foster-Seeley prism is a preferred polarizer since an alternate optical path is provided for light polarized perpendicular to the transmission axis of the prism.

It will be readily appreciated by one skilled in the art that substitution for the Foster-Seeley prism 11 can include a Glan-Thompson, Rochon, or Nicol prism, or a linear polarizer in sheet form such as is marketed by Polaroid Corporation. Any polarizing device that provides a plane polarized light beam can be employed in apparatus constructed according to the principles of this invention; however, the Foster-Seeley prism is particularly preferred since rejected light therefrom is directed at 90° to the transmitted light beam, and is readily employed for feedback signals or for providing a second output beam.

After passing through the prism 11 the input polarized light beam passes throught a quarter wave retardation plate 12 located in the input light tube. The quarter wave retardation plate 12 comprises a medium of birefringent or doubly refracting material which divides an incident light beam plane polarized at 45° to the optic axis of the plate into two beams of equal intensity but with slightly different velocities within the retardation plate. The optical characteristics of the retardation plate are carefully selected so that the more retarded beam is one quarter cycle out of phase from the less retarded beam. The retardation plate 12 has a crystal axis which is placed at an angle theta (FIG. 1) to the transmission axis of the prism 11. For most purposes it is preferred that the angle theta be 45° and can be either to the right or to the left of the polarizer axis. If at an angle other than 45°, elliptical polarization of the light occurs since the more retarded and less retarded beams are of unequal intensity. It will also be apparent to one skilled in the art that doubly refracting materials, split mica or certain plastic films can advantageously be employed in constructing a circular polarizer.

There is next provided on the optic axis of the input light tube 23 a focusing lens 13. A conventional lens of suitable focal length is employed for focusing the light beam. The focal length is such that the entering collimated beam is focused on the signal transducer 15.

Also provided on the housing 21 is an output collimating tube 24 including an output collimating lens 16 (not shown in FIG. 2) substantially identical with the input focusing lens 13, and positioned so that the diverging beam from the transducers 15 is collimated.

In the light tight enclosure of the housing 21 there is provided a platform 26 (FIGS. 2–5) which is located in the housing by a centrally positioned pin 27 closely engaging a hole 28 in the platform. The platform can be pivotally moved on the pin 27 so as to align the transducers 15 exactly on the optic axis of the light input tube 13 and when properly adjusted the platform is bolted securely to the housing. On the platform 26 there is mounted a beam splitter 14 which is preferably a cube of quartz having a beam splitting plane 25 giving exactly equal transmission and reflection of light of the wave length of interest. Since the light is circularly polarized, equal transmission and reflection are more readily obtained than would be the case with plane polarized light from the laser mensioned above. As shown in FIGS. 6 and 7 the beam splitter 14 is fixed to a circular base 29 which is preferably also of quartz. The circular base or disk is secured to the platform 26 by a clamping ring 30 which is bolted to the platform. Although a cubic beam splitter is preferred for minimizing optical aberrations, it will be apparent to one skilled in the art that a flat plate beam splitter or the like could also be advantageously used in the practice of this invention.

Mounted on the platform 26 are two substantially identical pedestals 33, only one of which will be described in detail. Each of these pedestals has a cylindrical body 34 which is positioned between a V-groove 35 in the platform and a corresponding V-groove 36 in a clamping block 37. This permits pivotal or rotational adjustment of the pedestal as hereinafter described. To facilitate rotational adjustment, flats 38 are provided on the pedestal body to permit adjustment even when the V-block 37 is fairly tightly clamped to the platform and the pedestal is subject to considerable friction. This is of assistance in fine adjustment.

As is shown in somewhat greater detail in FIGS. 8 and 9 the pedestal has an assembly of piezoelectric transducer elements comprising a bias transducer assembly 39 and a signal transducer 15. The bias transducer assembly 39 comprises a series of disks of piezoelectric material 42 having thin metal layers 43 on opposite sides thereof so that an electric field can be applied across each disk (FIG. 10). The disks of piezoelectric material are preferably of a generally circular shape with two asymmetrically located ears 44 thereon. The piezoelectric disks are fabricated so that the application of an electric field between the two faces of the disk causes a change in the thickness of the disks. The disks have identical polarity so that a positive increase in voltage in one direction will, for example, cause an increase in thickness. The bias transducer assembly 39 has alternate disks inverted so that the polarity of alternate disks is opposite. A stack of disks so assembled has no overall change in dimension when a voltage is applied across the entire stack, since the increase in thickness of one disk is offset by the decrease in thickness of the adjacent disk. However, when a voltage is applied to each individual disk with a polarity corresponding to the polarity of the disk, a substantial dimensional change is obtained in the stack. The bias transducer assembly is therefore fabricated so that alternate pairs of adjacent metal layers 43 are interconnected electrically. Application of a voltage to the interconnection then applies a voltage of opposite polarity on alternate disks in the assembly, and the resultant dimensional changes are summed. Thus, the piezoelectric elements of the bias transducer are electrically connected in parallel, but mechanically connected in series so that a much lower voltage is required for a given mechanical displacement than is required for a transducer having but one piezoelectric element. The two bias transducer assemblies 39 are also driven in opposite phase by suitable electrical or polarity arrangements in order to minimize the displacement required of either assembly alone.

The inversion of alternate disks 42 in the bias transducer assembly also staggers the ears 44 so that electrical connection can be made to the metal layers 43 thereon without severe hindrance. Each metal layer 43 has an electrical lead 45 attached thereto, preferably by spot welding or thermo-compression bonding of the fine wire 45 to the thin metal layer 43. In order to obtain maximum reliability, all metal layers have electrical leads, even though adjacent layers need not both have leads. Additionally it is desirable to have leads to each ear since a thin layer of adhesive which is between the adjacent metal layers may interfere with electrical contact therebetween, thereby slightly diminishing the total displacement available from the bias transducer. This effect is avoided by employing a conductive adhesive.

At the end of the bias transducer assembly 39 there is provided a signal transducer 15 illustrated in FIGS. 11 and 12 which comprises a small piezoelectric disk 46 having thin metal layers 47 on opposite sides thereof. Since the piezoelectric disk 46 in a preferred embodiment is about .013 inch in diameter and .004 inch thick, it is preferably cemented to a ceramic disk 48 which is conveniently employed in handling the small signal transducer. It is preferred that this disk be constructed of the same material as the piezoelectric transducer, but unpolarized, to minimize thermal stresses. A layer of conductive material 49 is provided on a surface of the ceramic disk for attachment of an electrical lead 17 thereto. The conductive material can be metal or more conveniently a conductive fused glass-metal combination which also serves as an adhesive. The layer 49 and the metal layer 47 on the signal transducer permit the application of a rapidly varying electric field across the signal transducer for transmitting information. An electrical lead 17 is secured to the metal layer 47 on the exposed face of the signal transducer 15. This lead is welded or bonded near the edge of the layer so that the central region remains reflective. The signal transducer 15 is cemented to the ceramic disk 48 which is in turn cemented to the bias transducer assembly 39. The assembly is centered on the pedestal so that the reflective metal layer 47 on the exposed face of the signal transducer is located in the focal plane of the focusing lens 13 and on the optic axis of the instrument. The described metal layers are preferably gold applied by vacuum deposition, and a preferred piezoelectric material comprises lead zirconium titanate. Gold so applied is a good mirror surface on the signal transducer as well as a good electrical conductor.

Four insulated posts 51 are provided on the pedestal 33 as shown in FIG. 8 for conducting electrical signals to the transducers. Two of these posts 51 have electrical leads 45 attached thereto for applying an electric field across the piezoelectric disks 42 of the bias transducer assembly 39 and two of the posts have electrical leads 17 attached thereto for applying a varying electric field across the signal transducer 15. The posts are electrically connected to conventional electrical connectors 52 for attachment to conventional bias voltage generators and signal generators.

A signal generator 53 (FIG. 1) is electrically connected to the signal transducers for applying a signal voltage thereto. The signal voltage generator is, for example, a conventional television camera which provides an electrical signal that carries information about the scene viewed. Amplifying and applying this signal to the signal transducers results in a light beam that is amplitude modulated with a signal related to the scene viewed. This optical signal is readily detected by conventional photodetectors and demodulated to form a television picture. Similarly, other varying electrical signal generators can be used in conjunction with the described optical modulator, such as, for example, a microphone and amplifier for audio frequency information. For some uses of the optical modulator a conventional oscillator is employed so that a sinusoidally varying output light beam is generated. Other signal generators can be employed as desired for other uses of the modulator.

The output of the photodetector 18 (FIG. 1) is fed to a feedback control circuit (FIG. 13) that controls the bias voltage on the bias transducers 39. Optimum operation of the interference modulator as an amplitude modulator is obtained when the mean difference between the path lengths of the two interferometer legs in half way between maximum destructive interference and maximum constructive interference. The variation in path length caused by the signal transducers swings on either side of this mean position and it is preferred that the swing be less than the swing needed to cause complete interference. This condition provides the maximum linearity of the amplitude modulated light beam. A bias voltage amplifier 59 provides a steady voltage of suitable magnitude that is electrically connected to the bias transducers 39 for adjusting them to the optimum position so that the mean difference in path lengths is halfway between maximum constructive and maximum destructive interference. Because of slight variations in geometry of the interferometer due to temperature gradients and the like, some drift from the optimum position is found during operation of the interferometer. The voltage generated by the bias voltage amplifier is adjusted to maintain maximum linearity in the signal obtained from the photodetector 18. It has been found that variations in linearity are small and slow. It will be understood that adjustment of the bias voltage amplifier can be manual if desired, and in this instance, any conventional D.C. voltage supply capable of controlled output is suitable for use as the bias voltage generator. By using a bias transducer assembly as described the voltage required is less than 100 volts.

FIG. 13 illustrates a bias stabilization feedback network employed with the described optical modulator for controlling the voltage on the bias transducers. Interposed between the laser 10 and the optical isolator 11, 12 is a beam splitter 60 which diverts a small proportion of the light from the laser to a reference photodetector 61 such as a photomultiplier tube or vacuum diode which converts the diverted light into an electrical signal. Preferably about 1% or less of the light from the laser is diverted by the beam splitter 60 to provide a reference signal. The rejected light beam from the optical isolator composed of the Foster-Seeley prism 11 and quarter wave plate 12 is directed to a photodetector 18. The electrical signals from the two photodetectors 18 and 61 are smoothed and amplified by low pass filter-amplifiers 62. The smoothed output of the reference photodetector 61 is appropriately attenuated by a bias adjustment 63 which is manually set to obtain optimum modulator operation. The bias reference voltage from the bias adjustment 63 is compared with the signal from the photodetector 18, representing the modulator's average modulation level, by a difference network 64. The difference between the signals from the bias adjust 63 and the photodetector 18 provides an error signal for a D.C. chopper amplifier 20 having an output that is applied across the bias transducers 39. Thus the D.C. output of the amplifier in this arrangement provides the transducer bias.

The closed loop bandwidth of such a feedback system is about one hundred cycles per second and the dynamic range of the bias stabilizer is sufficient to vary the path-length difference in the modulator by more than one and one-half wave lengths. The intensity of light rejected by the optical isolator provides a measure of the mean operating position of the modulator. Any variation in the output from the laser is compensated for in the reference photodetector 61 so that the bias stabilization network illustrated compensates only for variations occurring in the modulator itself. Basically the system provides that the average light output from the modulator is a selected proportion of the output from the laser.

The arrangement of mechanical and optical elements in the interferometer light modulator is employed for rapid and accurate alignment of the instrument. In order to obtain alignment of the instrument a collimated light beam such as, for example, from a laser, is directed into the modulator through the input light tube and the optical elements therein. Minor adjustments of the position of the focusing lens 13 can be made so that the beam is sharply focused on one of the signal transducers 15. If necessary the platform 26 can be pivoted for alignment of the transducers on the optic axis of the focusing lens. The beam splitter 14 which divides the focused light beam into two beams with paths of similar length is placed on the platform on the optic axis of the focusing lens 13. Each of the two beams formed by the beam splitter is focused on one of the signal transducers 15.

Because of tolerances involved in the manufacture and assembly of the various elements of the modulator, the beam of light reflected from a signal transducer 15 may not be exactly coincident with the incident beam, and unless compensated for, the recombined beams would diverge. The reflected beam may have a slight angular difference from the incident beam and this angle can be in any position around the incident beam. Means are provided for swinging the reflected beam from each transducer into a common plane.

The arrangement of a cylindrical body 34 on the pedestals 33 in a pair of V-grooves 35 and 36 is provided for pivotal adjustment of the entire pedestal assembly. By rotating the pedestal by means of the flats 38 thereon any angular deviation of the reflected light beam is rotated so as to lie in a common plane including the input focusing lens 13, the output collimating lens 16 and the signal transducer 15. Each of the pedestal assemblies is adjusted in this manner so that all of the light beams, incident and reflected, are in a common plane, the plane of the paper in FIG. 2.

Adjustment of the beam splitter 14 then superimposes the two reflected beams for optimum interference. This adjustment is readily accomplished by rotating the beam splitter in the circular clamping ring 30 until the beam splitting plane 25 exactly bisects the angle between the normals to the signal transducer surfaces. In this condition even though there may be a slight deflection of the light beam directed to the signal transducer because of refraction by the beam splitter this deflection is canceled in the reflected beam so that the two reflected beams are exactly superimposed by the beam splitter. Thus although the optical elements may not be geometrically exactly aligned, they are optically aligned so that a properly directed light beam interacts with each optical element in turn.

The condition of exact superposition of the two light beams is readily observed by noting the maximum interference obtained in an output light beam from the modulator either from the output light tube or preferably with the photodetector 18 monitoring the reflected light beam. After adjusting the angle of the beam splitter 14 this unit is securely clamped to the platform 26 by the clamping ring 30. A preferred method of observing the maximum interference obtained is to apply a varying voltage across the signal transducer to cause changing interference in the recombined light beam. For this purpose a conventional oscillator operating at a few thousand cycles per second along with a high voltage amplifier is preferably employed as the signal generator. The variation in light intensity is readily observed in the output of the photodetector with a conventional oscilloscope. Adjustment of the pedestals and beam splitters is made as described to obtain the maximum depth of modulation.

The optical modulator is operated by passing a collimated light beam from the laser 10 through the Foster-Seeley prism 11 and through the quarter wave retardation plate 12. This combination effects a circular polarization of the light in the interferometer. The collimated light beam is focused by the focusing lens 13 into a sharp image on the signal transducers 15. The beam splitter 14 in the optical path splits the focused light beam into two equal beams each of which impinge on one of the signal transducers. The light is reflected from the signal transducers and recombined in the beam splitter 14 to give an output beam which is directed through the collimating lens 16 and a second beam which is redirected through the focusing lens 13. The redirected circularly polarized beam 13 is plane polarized by the quarter wave retardation plate 12. The plane of polarization of this reflected beam is normal to the plane of polarization of the original collimated beam from the laser. It is therefore rejected by the Foster-Seeley prism and passed out of the light modulator through the retardation plate 58. This rejected light, when used for providing bias stabilization feedback, then passes to the photodetector 18 where it is converted to an electrical signal having a magnitude proportional to the intensity of the rejected light.

By employing the optical isolator as described to prevent reflection to the laser, stable operation of the laser is obtained. Intensity fluctuations previously noticed are no longer observed and the amplitude modulated output beam from the optical modulator is improved. Good signal to noise ratio is obtained since noise from the laser is eliminated.

The recombined light beam transmitted through the collimated lens 16 is formed into a collimated beam which is transmitted an arbitrary distance to suitable receiving apparatus.

Since both recombined light beams are similarly amplitude modulated, both can be used for transmitting information. The beam deflected by the Foster-Seeley prism is of slightly poorer quality and intensity since it is transmitted and reflected by additional optical elements. This diverted amplitude modulated light beam may be usefully employed, for example, for redundant transmission of information to suitable receiving apparatus or for transmitting identical information to more than one receiver. When so used, the photodetector is removed from the light path and the collimated beam transmitted to suitable receivers, and if desired, a small amount of light may be split from one of the transmitted beams to provide feedback for proper bias adjustment.

The two light beams from the beam splitter 14 traverse substantially equal length paths between the beam splitting plane 25 and the signal transducer 15 and when recombined undergo constructive or destructive interference. The electric field on the bias transducer assembly 39 is adjusted so that the interference is approximately halfway between the maximum constructive interference and the maximum destructive interference. A varying electric signal is applied to the signal transducers 15 to cause a displacement thereof about the mean position to which they are adjusted by the bias transducer 39. As the electric field on the signal transducer varies, the relative path lengths of the two light beams vary and the recombined light beams oscillate between constructive and destructive interference in response to the electric field. For amplitude modulation it is preferred that the amplitude of oscillations in dimensions of the signal transducers be sufficiently small that complete constructive or destructive interference is avoided. By operating between these limits good linearity of amplitude modulation is obtained.

Any random slow variation in the path lengths of the two interferometer legs may cause a decrease in linearity of the modulated light beam. Since the retro-directed light beam detected by the photodetector 18 is identical to the output light beam except opposite, in phase, variations from good linearity are readily detected and adjustment of the bias transducers made so that the modulator operates in an optimum condition.

It is understood that the above described embodiment is merely illustrative of the application of the principles of this invention. Those skilled in the art may readily devise other variations that will embody the principles of this invention. It is therefore to be understood that within the scope of the appended claims the invention may be practiced otherwise than as specifically described.

What is claimed is:

1. In an optical interferometer having a beam splitter and first and second reflective surfaces for receiving light from the beam splitter and reflecting received light back toward the beam splitter;
   first alignment means adjustably mounting the reflective surfaces for pivotal motion about axes substantially coincident with the directions of light transmission between the beam splitter and the reflective surfaces; and
   second alignment means adjustably mounting the beam splitter for pivotal motion about an axis normal to said directions.

2. An optical interferometer comprising:
   a beam splitter;
   two reflective surfaces optically aligned with said beam splitter;
   means for mounting each of said reflective surfaces for motion about an axis substantially coincident with the direction of light transmission between said beam splitter and said reflective surface; and
   means for pivotally mounting said beam splitter for motion about an axis normal to said directions of light transmission.

3. An optical interferometer comprising:
   a base;
   a beam splitter mounted for rotational adjustment on said base;
   two reflective surfaces optically aligned with said beam splitter for receiving a light beam therefrom and reflecting the light beam thereto for optical interference;
   a cylindrical member having one of said reflective surfaces mounted thereto normal to the axis thereof, said cylindrical member having its axis substantially coincident with the direction of light transmission between said beam splitter and said one reflective surface; and
   means for releasably securing said cylindrical member to said base for limiting rotation thereof.

4. An optical interferometer as defined in claim 3 wherein said beam splitter comprises:
   a transparent member having a beam splitting plane;
   a circular disk normal to said beam splitting plane; and
   means for releasably securing said circular disk to said base for limiting rotation thereof.

5. An optical interferometer comprising:
   a beam splitter;
   a first reflective surface for reflecting light to said beam splitter along a first optical path therebetween;
   a signal transducer having a second reflective surface for reflecting light to said beam splitter along a second optical path therebetween;
   means for rotating said signal transducer about an axis substantially coincident with the second optical path for alignment thereof; and
   means for rotating said beam splitter about an axis substantially normal to the axis of rotation of said signal transducer for alignment thereof.

6. An optical interferometer having optical elements arranged in a common plane comprising:
   a base;
   a beam splitter mounted for rotational adjustment on said base about an axis normal to the common plane;
   a signal transducer having a reflective surface optically aligned with said beam splitter for reflecting light thereto;
   a second reflective surface optically aligned with said beam splitter;
   a bias transducer supporting said signal transducer for varying the distance between said signal transducer and said beam splitter;

a cylindrical pedestal supporting said bias transducer; and clamping support means for said cylindrical pedestal for releasably limiting rotation thereof of said base about an axis substantially in the common plane.

7. An optical interferometer as defined in claim 6 wherein said bias transducer comprises a plurality of piezoelectric disks in a stack, each of said disks having a polarity opposite to each adjacent disk and having a generally circular shape with radially extending ears; and a conductive layer between each of said disks for applying an electric field thereacross.

8. In an optical interferometer having a beam splitter, a reflective surface aligned with the beam splitter and a reflective transducer aligned with the beam splitter for varying the optical path length between the transducer and the beam splitter, an improved transducer assembly comprising:

a cylindrical pedestal;

a bias transducer assembly comprising a plurality of piezoelectric disks of alternating polarity mounted on the axis of said cylindrical pedestal;

means for applying a voltage across each of said piezoelectric disks;

a reflective piezoelectric signal transducer mounted on said bias transducer assembly; and means for applying voltages to said bias transducer assembly and to said signal transducer.

9. Alignment means for an interferometer comprising a beam splitter and two reflective surfaces, all in a common plane comprising:

means for illuminating the beam splitter with a beam of monochromatic light so that the light beam is split into two substantially equal components directed to said reflective surfaces;

means for rotating each of said reflecting surfaces about an axis parallel to a common plane for directing the reflected component of the light beam in the common plane and towards the beam splitter; and means for rotating the beam splitter about an axis normal to the common plane for bisecting the angle between normals to the reflective surfaces with a beam splitting plane.

10. Alignment means for an interferometer comprising a beam splitter and two reflective surfaces, all on a common plane comprising:

means for illuminating the beam splitter with a beam of monochromatic coherent light so that the light beam is split into two substantially equal components directed to said reflective surfaces;

means for varying the optical path length between said beam splitter and one of said reflective surfaces for varying optical interference in a recombined beam to produce an amplitude modulated light beam;

means for rotating each of said reflective surfaces about an axis parallel to the common plane for directing the reflected component of the light beam in the common plane and toward the beam splitter;

means for detecting the depth of modulation obtained in the recombined light beam; and means for rotating the beam splitter about an axis normal to the common plane until the depth of modulation is a maximum.

11. An optical modulator comprising:

a housing;

a platform in said housing;

light entrance means in said housing;

light exit means in said housing;

a first pedestal on said platform having means for rotational adjustment of said pedestal;

a second pedestal on said platform having means for rotational adjustment of said pedestal, said second pedestal being aligned with said light entrance means and normal to said first pedestal;

a bias transducer assembly on each of said pedestals comprising a plurality of piezoelectric disks of alternating polarity;

a signal transducer on each of said bias transducer assemblies comprising a piezoelectric disk and means for applying an electrical signal thereacross; and a beam splitter mounted for rotational adjustment on said platform in an optical path between said light entrance means and said signal transducers whereby said pedestals and said beam splitter are adjustable for aligning optical paths in said modulator.

12. An optical modulator comprising:

a light tight housing;

light entrance means in said housing including a focusing lens;

light exit means in said housing including a collimating lens, the optic axes of said light entrance means and said light exit means lying in a common plane;

a platform in said housing mounted for pivotal adjustment about an axis normal to the common plane;

a beam splitter on said platform in the common plane in optical alignment with said light entrance means and said light exit means, said beam splitter being mounted for pivotal adjustment about an axis normal to the common plane;

a first pedestal on said platform having a first reflective surface in optical alignment with said light entrance means;

a second pedestal on said platform having a second reflective surface in optical alignment with said light exit means;

said first and second pedestals each having a cylindrical body means for pivotal adjustment about an axis parallel to the common plane for aligning light beams from the reflected surfaces in the common plane;

each of said pedestals further comprising a bias transducer assembly having a plurality of stack piezoelectric disks of alternating polarity and means for applying a voltage across each of the piezoelectric disks; and a piezoelectric signal transducer on each of said bias transducer assemblies including means for applying a voltage thereacross said first and second reflective surfaces being on said respective signal transducers, whereby reflected light is precisely recombined by said beam splitter when pivotally adjusted for the beam splitting plane to bisect the angle between the reflected light beams from said first and second reflective surfaces.

13. An optical modulator comprising:

a light tight housing;

light entrance means in said housing including a polarizer for plane polarizing a light beam; a quarter wave retardation light for converting the plane polarized light beam to a circularly polarized light beam; and a focusing input lens;

light exit means in said housing including a collimating lens, the optic axes of said light entrance means and said exit means lying in a common plane;

a beam splitter in the common plane in optical alignment with said entrance means and said light exit means, said beam splitter comprising a cube of transparent material having a beam splitting plane therein; a circular disk secured to said cube; and means for alternatively permitting and limiting rotation of said disk about an axis normal to the common plane;

a first pedestal assembly in optical alignment with said light entrance means;

a second pedestal assembly in optical alignment with said light exit means and substantially normal to said first pedestal;

said first and second pedestal assemblies each comprising a cylindrical body having an axis in the common plane; a bias transducer assembly having a plurality of piezoelectric disks of alternating polarity and means for applying a voltage across each of the piezoelectric disks; and a piezoelectric signal transducer on each of said bias transducer assemblies including means for applying a voltage thereacross; and means for alternatively permitting and limiting rotation of said pedestal assemblies.

14. An optical interferometer having first and second orthogonally arranged reflective surfaces comprising:

a beam splitter assembly mounted between said reflective surfaces;

means for adjustably mounting at least one of said reflective surfaces for pivotal motion about an axis substantially coincident with the direction of light transmission between said one reflective surface and said beam splitter;

said beam splitter assembly comprising:

a cube of transparent material having a beam splitting plane therein; and means for alternatively permitting and limiting rotation of said cube relative to the reflective surfaces; whereby the interferometer is aligned by adjusting said one reflective surface to locate the reflected beams in a common plane and rotating the cube to position the beam splitting plane to bisect the angle between the reflected beams.

References Cited

UNITED STATES PATENTS 3,302,027   1/1967   Fried et al. _ _ _ _ _ _ _ _ _ _ _ 88—14
3,170,982   2/1965   Hemstreet et al. _ _ _ _ _ _ _ 88—14

JEWELL H. PEDERSEN, *Primary Examiner.*

B. J. LACOMIS, *Assistant Examiner.*